Dec. 15, 1936.  H. F. SMITH  2,063,960
REFRIGERATING APPARATUS
Filed June 23, 1930   2 Sheets-Sheet 1

Dec. 15, 1936.  H. F. SMITH  2,063,960
REFRIGERATING APPARATUS
Filed June 23, 1930    2 Sheets-Sheet 2

Harry F. Smith INVENTOR
BY Spencer, Hardman & John
ATTORNEYS

Patented Dec. 15, 1936

2,063,960

UNITED STATES PATENT OFFICE 2,063,960

REFRIGERATING APPARATUS

Harry F. Smith, Dayton, Ohio, assignor, by mesne assignments, to General Motors Corporation, a corporation of Delaware Application June 23, 1930, Serial No. 463,085

16 Claims. (Cl. 183—120)

This invention relates to refrigerating apparatus and more particularly to an apparatus and method for conditioning air in buildings and the like.

An object of this invention is to provide for automatic maintenance of air at the proper condition of temperature and relative humidity in a building or portion thereof.

Another object of this invention is to provide an automatic central air treating plant to which and from which the air of a building is circulated in order to maintain the air in the building at the proper temperature and relative humidity.

Further objects and advantages of the present invention will be apparent from the following description, reference being had to the accompanying drawings, wherein a preferred form of the present invention is clearly shown.

Figure 1:
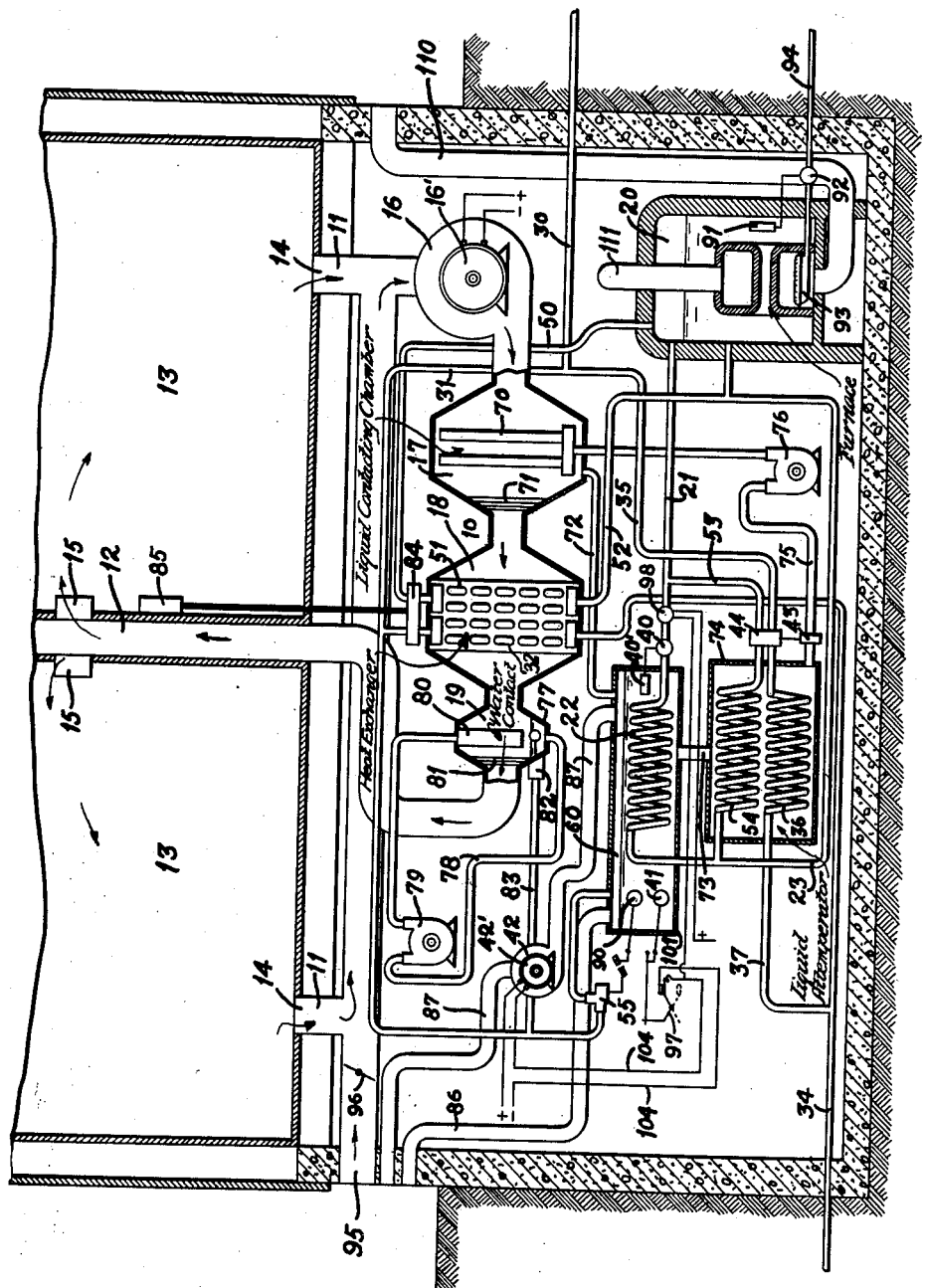
Fig. 1 is a view, diagrammatic in its nature, showing an apparatus embodying this invention.
Figure 2:
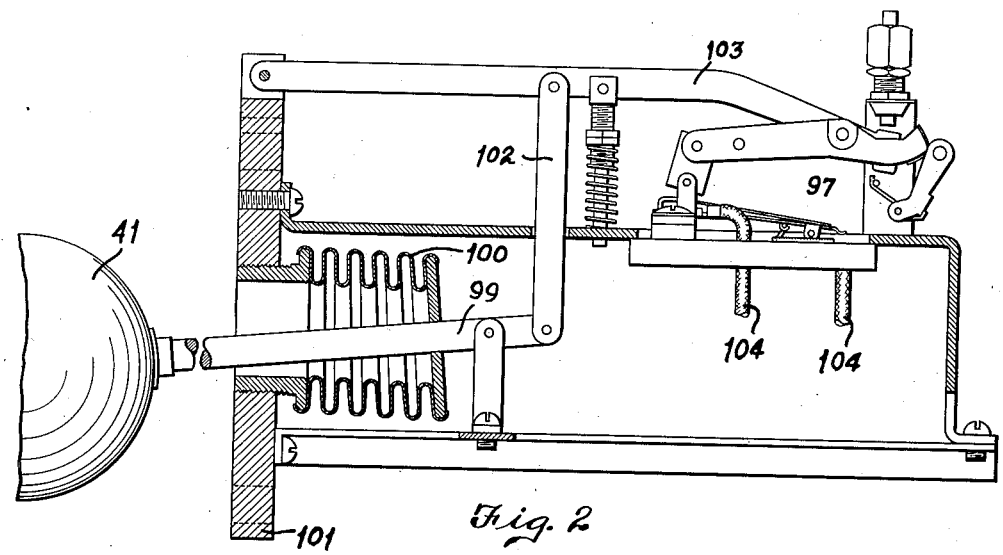
Fig. 2 is an enlarged cross-sectional view of a portion of Fig. 1.
Figure 3:
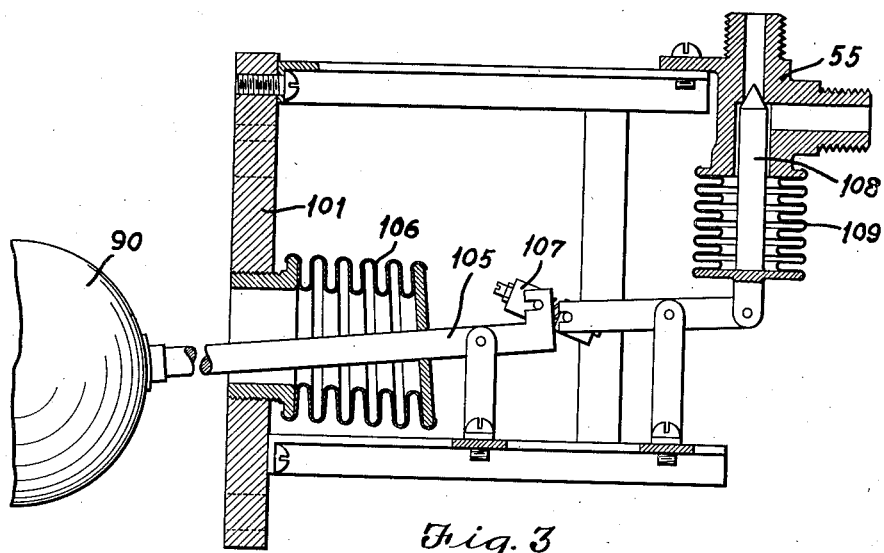
Fig. 3 is an enlarged cross-sectional view of another portion of Fig. 1.

An apparatus embodying features of this invention includes in general a central air treating plant 10 provided with ducts 11 through which air from the building to the central plant 10 is conducted. It also includes one or more ducts 12 through which air treated by the central treating plant is carried to one or more of the rooms of the building or any place to be cooled or heated. Preferably the ducts 11 have intake openings from the rooms 13 at a low level, such as the floor, through suitable registers 14. The duct or ducts 12 have discharge openings 15 into the rooms 13 preferably at a high elevation in the rooms, the elevation generally being higher than ordinary furniture.

The air which goes through the ducts 11 to the central plant 10 is treated in a slightly different manner under summer time conditions and under winter conditions. Under summer time conditions the air generally first has a certain amount of humidity removed by an absorbing liquid. This action heats the air so that it is subsequently cooled by some relatively cheap cooling medium such as water or outside air. Thereafter if desired the air being treated is contacted with water so that a certain portion of the water is evaporated and the temperature of the air is thus lowered. Under winter conditions, the air passing through the ducts 11 first has a certain humidity imparted to it at any suitable temperature. The air then is heated sufficiently above the temperature desired in the rooms 13 in order to compensate for the heat losses of the house. Thereafter the air is distributed to the various rooms.

The central treating plant preferably includes an air propelling device such as a fan or blower 16 which forces the air from the ducts 11 through a liquid absorbent contacting chamber 17, thence through a heating or cooling chamber 18, thence through a water evaporating chamber 19 and from thence through the duct or ducts 12 to the various rooms. Preferably the fan or blower 16 is continuously driven by means of a motor 16' so that the air is supplied to the rooms continuously. The action of the various treating agents on the air thus being circulated is varied in order to compensate for varying demands and thus maintain the air in the rooms at substantially constant temperature and relative humidity.

The liquid absorbing agent or hygroscopic in the chamber 17 may be contacted with the air in any suitable manner. Preferably it is contacted with the air by spray device 70 which sprays the liquid absorbent in the air. Eliminators 71 may be provided in order to prevent the carrying of the spray by the air from the chamber 17. The liquid absorbent, which may be calcium chloride, lithium chloride, bromide or iodide, glycerine or the like, is gathered in a sump and carried by the pipe 72 to a device 60 serving alternately as a concentrator or diluter in which water is added or removed from the absorbent as conditions require. From there the liquid absorbent is carried through a pipe 73 to a device 74 serving alternately as a heater or cooler, where the absorbent has the proper temperature imparted to it. From thence the liquid absorbent is carried by the pipe 75 to the pump 76 and from thence to the spray device 70. As will be hereinafter more fully explained, the action in the evaporator or diluter 60 and the heater or cooler 74 is automatically varied in order to impart to the air in the chamber 17 the proper relative humidity at any proper temperature so that when the air is distributed in the rooms 13 and after it has attained the normal temperature to be maintained in the rooms 13, it will have the desired relative humidity.

The air passing through the chamber 18 is heated in the winter and cooled in the summer by the action respectively of the steam coils 51 or the water coils 32. The coils 32 may be replaced by devices for interchanging heat with air outside of the building. The steam coils 51 are connected with the steam boiler 20 through the medium of the pipes 50 and 52, while the water coils 32 are connected through a pipe 31 with the city water supply pipe 30, then the discharge from the coils 32 passes through the waste pipe 34 to any suitable waste drain or the like. Obviously the coils 51 may be hot water coils instead of steam coils.

The air passing through the chamber 19 is contacted with water during the summer time in order to decrease the temperature and increase slightly the relative humidity when it is desired to have relatively humid but cooler air. This preferably is accomplished by providing a sump 77 from which the water is pumped through pipe 78 by means of a pump 79 to a suitable spray device 80. Eliminators 81 are provided to prevent the passage of unevaporated water into the ducts 12. The supply of water in the sump 77 is maintained at a substantially constant level by means of a float controlled valve 82 connected by means of a pipe 83 with the pipe 31 and the city water supply pipe 30. The water in the sump 77 is thus relatively cold.

The action of the coils 51 and 32 is governed by means of a suitable control device or double valve 84 connected to a thermostat 85. The action is such that in the winter time the thermostat 85 regulates the flow of steam through the coils 51 and in the summer time the thermostat 85 regulates the flow of water or cooling medium through the coils 32. It is obvious, however, that different thermostats and independent valves may be provided for the coils 51 and 32 respectively.

In the summer time, it is generally desirable to remove moisture from the air in the chamber 17. This may be accomplished by suitably concentrating the solution in the device or concentrator 60, suitably cooling the solution in the device or cooler 74 and thereafter spraying the cooled solution in the spray device 70. In order to accomplish this, steam is discharged from the boiler 20 through the pipe 21, coil 22, and returned through the pipe 23 to the boiler 20. The steam passing through the coil 22 is regulated by means of a valve 40 controlled by a thermostatic bulb 40' in the evaporator 60. At the same time water flows from the city water supply 30 through pipe 31 from which it branches through the pipe 83 to the sump 77 and through the coils 32 and waste drain 34. Water also is carried from the city water supply 30 through the pipe 35, coils 36 and pipe 37 to the drain 34 in order to cool the solution in the cooler 74. It is desirable to have the concentrating and cooling action automatic, and for this purpose the valve 40 maintains a substantially constant temperature in the evaporator 60 by controlling the flow of steam through the coil 22. The hydrostatic float 41 is so regulated that it operates the fan 42 by means of a motor 42' which causes air to pass through pipe 86 over the heated solution in the evaporator 60, from thence out through the pipe 87 and is discharged outside of the building. A thermostat 43 preferably placed in the pipe 75 controls the flow of water through the coil 36 so that the temperature of the solution passing from the cooler 74 is maintained at a substantially constant temperature. From this it is to be seen that the air in the summer time first has a definite temperature and relative humidity imparted to it by the solution sprayed from device 70. The heat of absorption is then removed from the air by means of the water coils 32 and thereafter the temperature of the air is further lowered by means of the evaporation of water in the chamber 19. It is to be seen that air may be obtained at ordinary city water temperature and a relatively low humidity or that air may be obtained at relatively high humidity but at a much lower temperature than the city water.

In the winter time, a certain amount of moisture is added in the chamber 17 at a suitable temperature, thereafter the air is heated in the chamber 18 by the coils 51 to a sufficient high temperature to compensate for heat losses of the building. That is, the air must be of sufficiently higher temperature in the ducts 12 so that when the air is discharged in the room 13 it tends to maintain the temperature in the rooms at a certain constant temperature in spite of heat losses through the walls of the building. In order to impart the desired humidity and temperature to the air in the winter, steam flows from the heater 20 through the pipe 50, coils 51 and from thence the condensate flows through pipe 52 back to the heater or boiler 20. Steam also flows through the pipe 21 through the branch 53, coil 54 and from thence the condensate flows through the pipe 23 back to the boiler 20. It is to be understood that the coil 54 preferably is above the level of the liquid in the boiler 20, although it is shown diagrammatically below in order to avoid complications in the drawings. Water from the city supply 30 flows through pipe 31 and from thence to a control 55 into the diluter 60. A constant temperature and concentration of solution is preferably automatically maintained in the device 60. This is accomplished, in the winter time, by causing the hydrostatic float 41 to prevent the action of the fan 42 and to prevent the flow of steam through the coil 22. The hydrostatic float 90 operates to add water through the device 55 in order to compensate for the water evaporated in the chamber 17. The solution then has any predetermined desired temperature imparted to it in the device 74, preferably by causing the thermostat 43 to control by the double valve 44 the flow of steam through the coil 54 and to prevent the flow of water through the coil 36. It is to be understood that different thermostats and independent valves may be provided to control the action of the water in the coil 36 and of steam through the coil 54 if desired.

The heater or boiler 20 may provide either steam or hot water as desired, it being understood that when steam is mentioned specifically it may be ordinarily replaced by hot water. The temperature in the heater or boiler 20 is preferably maintained at a constant temperature by providing a thermostat 91 which controls the action of a valve 92 for controlling the combustion in the burner 93. The burner 93 may be a gas burner and may thus be supplied with gas through pipe 94. Air for the combustion of the burner 93 is preferably provided by means of an air duct 110 which is connected to the outside of the building, while the products of combustion are carried by means of the pipe 111 to a suitable chimney also leading outside of the building.

If it is desired to add outside air for circulation through the system, a fresh air intake 95 may be provided and may be connected to the duct 11. A suitable valve 96 controls the proportion of fresh air which is thus circulated through the system.

The hydrostatic float 41 may control the action of the fan 42 and also under certain conditions the flow of steam through the coil 22 by any suitable means preferably by electric action. Thus the hydrostatic float 41 actuates a snap switch 97 which starts and stops the motor 42 and operates a magnetic valve 98 for controlling the flow of steam in the coil 22. The snap switch may be of any suitable construction. This hydrostatic float 41 is connected to an arm 99 suitably connected to a sylphon 100 which is connected to the wall 101 of the evaporator 60. The arm 99 operates through a suitable link 102, the arm 103 of the snap switch 97. Since snap switches are widely known it is unnecessary to describe specifically any type, it being understood that the flow of electric current through the leads 104 is broken by the action of the snap switch 97.

The hydrostatic float 90 controls the addition of water in the winter in order to dilute the solution in the diluter 60. For this purpose the float 90 is connected to an arm 105 which is suitably sealed by means of a sylphon bellows 106 connected to the wall 101 of the device 60 which thus acts as a diluter. The arm 105 operates a snap link 107 which controls the movement of the valve stem 108 to open and close the valve 55. If desired a suitable sylphon packing 109 is provided for the stem 108.

When it is desired to use the herein described method or apparatus with the use of a lithium halide salt, the solution may be concentrated and proper temperatures may be imparted to it in accordance with the chart disclosed in the copending application of Francis R. Bichowsky, Serial No. 457,142, filed May 29, 1930. Under such circumstances it is to be understood that when the solution is to be concentrated in the device 60 the thermostat 40' is regulated so that the steam in the coil 22 imparts to the solution the temperature of the boiling point of the properly concentrated lithium halide solution. Also the thermostat 43 may be regulated to impart to the solution passing through the pipe 75 the proper temperature in order to impart to the air in the chamber 17 the desired relative humidity and temperature as indicated in the chart of the said copending application.

The spraying device 70 may be used to impart the total temperature necessary to the air without the use of the coils 51. Under such conditions the steam coil 54 assumes the entire heating load for the system and must be of a capacity to provide sufficient heat for the entire building. Further if the spray from device 70 is to provide the entire cooling action during the summer time by the elimination of the coil 32, then the water coil 36 must be of sufficient capacity to provide the entire necessary cooling action for the building in the summer time.

The hydrostatic float 41 and the thermostat 40' may be used independently of each other, either being sufficient to accomplish proper concentration. If the float 41 alone is used, it starts the blower 42 and the flow of steam through coils 22 by means of the valve 98 when the solution is insufficiently concentrated and stops the action when the concentration reaches a proper degree. When the thermostat 40' alone is used, a suitable steam escape is provided, such as the pipe 87. The thermostat 40' is regulated to maintain a temperature equal to the boiling point of properly concentrated solution. When the temperature rises above this point the solution is sufficiently concentrated and the flow of steam in coil 22 is stopped by means of the valve 40. When the temperature of the solution does not reach the setting of the thermostat, the solution is under-concentrated and the flow of steam in the coils 22 continues until sufficient concentration is attained.

While the form of embodiment of the invention as herein disclosed, constitutes a preferred form, it is to be understood that other forms might be adopted, all coming within the scope of the claims which follow.

What is claimed is as follows:

1. The method of conditioning air which comprises circulating air to and from an enclosure to a treating zone, contacting the air in said zone with a hygroscopic liquid of predetermined degree of concentration and temperature, automatically changing the temperature of the air being treated in accordance with the temperature of the air in said enclosure circulating said hygroscopic liquid in a closed path to and from said zone, automatically restoring the said liquid, after contact with said air, its predetermined degree of concentration and temperature by controlling the addition of water to said liquid in accordance with the specific gravity of said liquid.

2. The method of conditioning air which comprises circulating air to and from an enclosure to a treating zone, contacting the air in said zone with a hygroscopic liquid of predetermined degree of concentration and temperature, automatically changing the temperature of the air being treated in accordance with the temperature of the air in said enclosure, circulating said hygroscopic liquid in a closed path to and from said zone, automatically restoring to said liquid, after contact with said air, its predetermined degree of concentration and temperature by controlling the removal of water from said liquid in accordance with the specific gravity of said liquid.

3. The method of conditioning air which comprises circulating air to and from an enclosure to a treating zone, contacting the air in said zone with a hygroscopic liquid of predetermined degree of concentration and temperature, automatically changing the temperature of the air being treated in accordance with the temperature of the air in said enclosure, circulating said hygroscopic liquid in a closed path to and from said zone, automatically restoring to said liquid, after contact with said air, its predetermined degree of concentration and temperature by controlling the removal of water from said liquid in accordance with the specific gravity of said liquid while maintaining said liquid at a predetermined temperature.

4. The method of conditioning air which comprises circulating air to and from an enclosure to a treating zone, contacting the air in said zone with a hygroscopic liquid of predetermined degree of concentration and temperature, automatically changing the temperature of the air being treated in accordance with the temperature of the air in said enclosure, circulating said hygroscopic liquid in a closed path to and from said zone, automatically restoring to said liquid, after contact with said air, its predetermined degree of concentration and temperature by automatically restoring said liquid to its proper degree of concentration by controlling the addition of water to said liquid in accordance with the specific gravity of said liquid and the removal of water from said liquid in accordance with the specific gravity of said liquid while maintaining said liquid at a predetermined temperature, and automatically changing the temperature of said liquid after it has its proper degree of concentration in accordance with the temperature of said liquid as it circulates to said treating zone.

5. An apparatus for conditioning air comprising a central air conditioning plant, conduits leading to and from said plant to a plurality of rooms of a building, means in said plant for contacting air from said rooms in a contacting zone with a hygroscopic liquid, means for circulating said hygroscopic liquid in a closed path to and from said zone, means for automatically restoring said liquid after contact with said air to a predetermined degree of concentration and temperature by the addition of water to said liquid in accordance with the specific gravity of said liquid, and means for automatically changing the temperature of the air being treated in accordance with the temperature of the air in one of said rooms.

6. An apparatus for conditioning air comprising a central air conditioning plant, conduits leading to and from said plant to a plurality of rooms of a building, means in said plant for contacting air from said rooms in a contacting zone with a hygroscopic liquid, means for circulating said hygroscopic liquid in a closed path to and from said zone, means for automatically restoring said liquid after contact with said air to a predetermined degree of concentration and temperature by the removal of water from said liquid in accordance with the specific gravity of said liquid, and means for automatically changing the temperature of the air being treated in accordance with the temperature of the air in one of said rooms.

7. An apparatus for conditioning air comprising a central air conditioning plant, conduits leading to and from said plant to a plurality of rooms of a building, means in said plant for contacting air from said rooms in a contacting zone wtih a hygroscopic liquid, means for circulating said hygroscopic liquid in a closed path to and from said zone, means for automatically restoring said liquid after contact with said air to a predetermined degree of concentration and temperature by the addition of water to said liquid in accordance with the specific gravity of said liquid, and means for automatically changing the temperature of the air being treated in accordance with the temperature of the air in one of said rooms.

8. In combination, a building having a room and an air conditioning space, a duct for conveying conditioned air from said space to said room, a furnace having means for increasing the intrinsic thermal energy of water, means for selectively transferring a portion of said intrinsic thermal energy to the air in said air conditioning space, means for selectively reducing the moisture content of the air in said air conditioning space by the change in the condition of a refrigerant, and means for utilizing a portion of said intrinsic thermal energy to aid in restoring said refrigerant to its original condition.

9. In combination, a building, a furnace in said building having means for increasing the intrinsic thermal energy of water, means for transferring a portion of said intrinsic thermal energy to the air in the building during cold seasons, means for reducing the moisture content of the air in the building during warm seasons by changing the condition of a refrigerant and means for utilizing a portion of said intrinsic thermal energy to aid in restoring said refrigerant to its original condition.

10. The method of conditioning air in a building which comprises increasing the intrinsic thermal energy of water, utilizing said intrinsic thermal energy to heat the air in said building during cold seasons, reducing the moisture content of the air in said building during warm seasons by changing the condition of a refrigerant, and utilizing said intrinsic thermal energy to aid in restoring said refrigerant to its original condition.

11. The method of removing a constituent from a gas which comprises contacting a stream of said gas with a relatively cold portion of a closed circulating cycle of a liquid having a selective affinity for said constituent, applying heat to another portion of said closed circulating cycle and automatically varying the amount of heat so applied to maintain said last named portion within predetermined temperature limits, and contacting said last named portion while in a heated condition with a forcibly circulated second stream of gas to remove said constituent from said liquid and cooling said last named portion for recontact with said first named stream of gas.

12. The method of removing a constituent from a gas which comprises contacting said gas with a relatively cold portion of a closed circulating cycle of a liquid having a selective affinity for said constituent, heating said liquid in a portion of a closed circulating cycle, forcing a stream of gas in contact with said liquid to remove said constituent from said liquid, and automatically varying the volume of said stream of gas in accordance with a condition in said liquid.

13. The method of conditioning air in a building which comprises flowing a first stream of air for the interior of the building through an air treating zone, contacting said first stream of air in said zone with a circulated hygroscopic liquid, heating said hygroscopic liquid after contact with said first stream of air, flowing a second stream of air in the interior of said building to the exterior of said building, contacting said hygroscopic liquid while in a heated condition with said second stream of air, cooling said hygroscopic liquid and recontacting it with said first stream of air.

14. The method of conditioning air in a building which comprises flowing a first stream of air for the interior of the building through an air treating zone, contacting said first stream of air in said zone with a circulated hygroscopic liquid, heating said hygroscopic liquid after contact with said first stream of air, flowing a second stream of air from the exterior of said building into the interior of said building, contacting said hygroscopic liquid while in a heated condition with said second stream of air, cooling said hygroscopic liquid and recontacting it with said first stream of air.

15. The method of conditioning air in a building which comprises flowing a first stream of air for the interior of the building through an air treating zone, contacting said first stream of air in said zone with a circulated solution of lithium halide, heating said solution of lithium halide after contact with said first stream of air, flowing a second stream of air in the interior of said building to the exterior of said building, contacting said solution of lithium halide while in a heated condition with said second stream of air, cooling said solution and recontacting it with said first stream of air.

16. The method of conditioning air in a building which comprises flowing a first stream of air for the interior of the building through an air treating zone, contacting said first stream of air in said zone with a circulated solution of lithium halide, heating said solution of lithium halide after contact with said first stream of air, flowing a second stream of air from the exterior of said building into the interior of said building, contacting said solution of lithium halide while in a heated condition with said second stream of air, cooling said solution and recontacting it with said first stream of air.

HARRY F. SMITH.